3,738,886
BONDING POROUS THERMOPLASTICS
Robert John Southgate, Ipswich, England, assignor to Imperial Chemical Industries Limited, London, England
No Drawing. Filed July 20, 1971, Ser. No. 164,417
Int. Cl. B29c 19/04
U.S. Cl. 156—273                              12 Claims

ABSTRACT OF THE DISCLOSURE

Bonding a porous polyolefine web having a porosity to air of at least $0.5 \times 10^{-2}$ mls./sq. cm. sec. cm. to a substrate by depositing a liquid substance having a conductivity of at least $1 \times 10^{-4}$ mhos cm.$^{-1}$ between the foam and the substrate and subjecting the system to pressure and radio frequency heating to heat the substance so that it melts the thermoplastic to effect a bond.

---

The present invention relates to an improved method for the bonding of porous thermoplastic polyolefines, particularly for the bonding of foamed polyolefine films.

Previous processes which have been used for the bonding of thermoplastic materials have involved subjecting superimposed pieces of the thermoplastic to direct heat and pressure. These techniques necessitate heating the surface of the thermoplastic adjacent to the heating element and are thus unsuitable for bonding foamed thermoplastics as the foamed structure along the zone of the bond tends to be destroyed. This results in an unsightly and ragged zone on the article.

It has been proposed in U.S. Pat. specification 2,859,153 to weld foamed thermoplastics by coating the surfaces to be welded with a solution of a material having a dipole moment between 1 and 4, evaporating off the solvent and then contacting the coated surfaces with each other and welding by subjecting the contacted surfaces to radio frequency heating.

This reference stresses that it is necessary to evaporate off the solvent prior to the welding operation to obtain a good weld.

We have devised a process for welding certain polyolefine foams wherein such a separate evaporation step is unnecessary.

It has also been proposed in Soviet Plastics July 7, 1962, pp. 29–31 to weld cellular thermoplastics by coating the cellular material with an adhesive or water, contacting the surfaces and heating by radio frequency heating. This article indicates that water only gave a suitable weld when bonding cellular polyvinyl chloride while for materials such as cellular polystyrene a heat activatable adhesive such as a urea-formaldehyde melamine-formaldehyde or a phenol-formaldehyde resin was necessary.

We have found that under certain conditions, certain polyolefine foams can be bonded using a liquid medium free from heat-activatable adhesive.

According to the present invention we provide a process for bonding a web of a porous aliphatic polyolefine material having a porosity to air of at least $0.5 \times 10^{-2}$ ml./cm.$^2$ sec. cm. and a thickness of less than 1.5 mm., to a substrate wherein a liquid composition that (a) Wets the porous polyolefin material and said substrate,
(b) Is free of heat-activatible adhesive, and
(c) Has a conductivity of at least $1 \times 10^{-4}$ mhos cm.$^{-1}$, is interposed between the porous polyolefine material and said substrate, the porous polyolefine and said substrate are contacted and subjected to radio frequency heating at a frequency of at least 25 mHz., whereby the porous polyolefine material is heated at its interface with the liquid composition to a temperature above the boiling point of the liquid composition and above the melting point of the polyolefine material so that the polyolefine material bonds to the substrate and the liquid vaporises, said substrate either having a similar melting point to the porous polyolefine whereby the substrate and the porous polyolefine fuse together during the welding operation or having an open structure whereby the porous polyolefine flows through, and mechanically interlocks with, the interstices of the substrate during the welding operation.

Aliphatic polyolefines that may be used include homopolymers of ethylene (both high and low density), copolymers of ethylene with minor amounts, e.g. up to 25% by weight, of comonomers such as propylene or vinyl acetate, homopolymers of propylene or copolymers of propylene with minor amounts e.g. up to 25% by weight of comonomers such as ethylene and homopolymers and copolymers of 4-methyl pentene-1 e.g. up to 25% by weight. Blends of such polymers may be used. The invention is particularly suited to bonding open cell foams made from low density (specific gravity less than 0.94) polyethylene.

The process of the present invention may be used to bond porous polyolefines to a wide variety of substrates. We are particularly concerned with bonding thin open celled foamed sheets and especially concerned with bonding two such foamed sheets or films together. Such sheets or films of the requisite porosity may be made by the process described in our British patent specification 1,220,-053. Alternatively, the porous web may be bonded to other thermoplastics, or to woven webs. Other porous webs that may be used include films which have been treated to produce small perforations therethrough and porous woven or non woven fibrous webs such as spun bonded fibrous webs. It is necessary that either the substrate to which the porous polyolefine is to be welded has a similar melting point to the porous polyolefine so that the two fuse together on welding or else that the substrate has an open structure so that the porous polyolefine can flow through the interstices of the substrate during the welding operation and hence mechanically interlock therewith.

Thus, for example, polyethylene foam webs can be bonded to polyethylene foamed or unfoamed substrates or to non woven polyethylene webs. Likewise, polypropylene foamed webs can be bonded to polypropylene foamed or unfoamed substrates. Also foamed polyolefines can be bonded to cotton fabric webs wherein the polyolefine flows through the fabric interstices to mechanically lock the foam web to the substrate.

If desired several layers of webs may be used with the liquid composition interposed between each layer. The process is particularly suitable for bonding two sheets of the foamed polyolefine together to enable containers such as sacks and bed linen, such as pillow cases, to be made from foamed films. The techniques of the present invention may also be used to make clothes from foamed polyolefines. In this way the seams may be formed by welding rather than stitching which is time consuming.

The liquid composition which is interposed between the porous polyolefine and the substrate has to satisfy a number of requirements, apart from being free of heat activatable adhesive.

Firstly it has to wet the porous polyolefine, or else a satisfactory weld will not be obtained. For this reason, water, which will satisfy the other requirements of the liquid composition, at least in so far as welding open celled polyethylene foams, is not suitable. However an aqueous solution of a surfactant will wet porous polyolefine webs and so can be used as the liquid composition in some cases. Where aqueous solutions are not suitable as they do not meet all the requirements in a particular case and so alternative liquids are used, it may also be necessary to incorporate surfactants into the alternative liquids to give wetting of the foam.

The quantity of surfactant used is immaterial provided that there is sufficient to cause the solution to wet the porous polyolefine web. In particular we have found that amounts of surfactant of from 0.5 to 5% by weight of the liquid composition are sutable. We have found that, when using a surfactant solution, the surfactant is preferably one that is solid at the boiling point of the solvent, e.g. water, used in the liquid composition. Examples of suitable surfactants include the anionic alkali metal salt surfactants such as sodium alkyl benzene sulphonates, sodium alkyl sulphates, sodium dialkyl sulphosuccinates, sodium (alkyl substituted diphenyl ether) sulphonates, particularly sodium docecyl benzene sulphonate, sodium diisobutyl sulphosuccinate, sodium dioctyl sulphosuccinate, and sodium lauryl sulphate.

The non-ionic and cationic surfactants such as ethylene oxide condensates with alkyl phenols or amines tend to be liquids at the boiling point of the solvent and give weaker bonds.

However mixtures of an anionic surfactant that is solid at the boiling point and a non-ionic surfactant that is liquid at the boiling point of the solvent give good results.

Another requirement for the liquid composition is that it has a conductivity of at least $1 \times 10^{-4}$ mhos cm.$^{-1}$. Liquid of lower conductivities do not have a high enough loss factor in the practical range of frequencies usable to generate sufficient heat to cause a good weld to be formed. As will be explained hereinafter, the lower the conductivity, the more critical are the welding conditions, and so we prefer to use liquids having conductivities well in excess of $1 \times 10^{-4}$ mhos cm.$^{-1}$. Sufficient conductivity can be ensured by the use of a suitable electrolyte dissolved in the liquid composition. In contrast to the statement in United States patent specification 2,859,153 that strong electrolytes such as sodium chloride cannot be used, we have found the use of such strong electrolytes to be very effective in the present invention.

We have found that for welding porous polyethylene the concentration of electrolyte has little effect on the welding process. An aqueous solution containing at least 0.3%, preferably 0.5 to 5%, by weight based on the weight of the aqueous solution of an electrolyte such as sodium chloraide gives good results for porous polyethylene.

It is believed that in the welding process, the radio frequency current causes heat to be generated in the liquid composition to fuse the polyefine and vaporise the liquid. The vapour diffuses away from the porous polyolefine/substrate interface into the porous polyolefine. It is for this reason that the porous polyolefine should have a porosity to air of at least $0.5 \times 10^{-2}$ mls./cm.$^2$ sec. cm. (as measured according to British Standard 2925). Webs of lower porosity cannot be satisfactorily welded since the vaporised liquid cannot diffuse away from the interface sufficiently fast and so a layer of the liquid composition is trapped between the fused polyolefine and the substrate thereby preventing a satisfactory weld being formed.

The porosity of the porous web also ensures that the liquid composition penetrates the porous web and wets its uniformly over the desired weld area.

The boiling point of the liquid composition should not be so high that the porous polyolefine is heated to a temperature too far above its melting point before the vaporised liquid has diffused away as this gives rise to the risk of destruction of the porous structure. Preferably the liquid has a boiling point below the melting point of the polyolefine. For polyethylene, water is a suitable liquid (provided it contains a surfactant).

However, when welding higher melting polyolefines such as polypropylene or poly 4-methyl pentene-1, we have found that it is necessary to incorporate a sufficient amount of some substance of good electrical conductivity, preferably an electrolyte such as sodium chloride, into the aqueous surfactant solution so that the heat is generated sufficient rapidly in the liquid compoistion by the radio frequency current so that the polyolefine is heated to its fusion temperature before the vaporised liquid has diffused away from the weld area. We have found that aqueous solutions containing 10–30% by weight, based on the weight of the composition of electrolyte, to be satisfactory for welding higher melting polyolefines. The presence of the electrolyte will also elevate the boiling point of the liquid compoistion to some extent, and, as the water is vaporised, the solid electrolyte will remain distributed over the weld area and heating of the polyolefine may be completed by radio frequency heating of this solid electrolyte.

Alternatively higher boiling liquids, such as propionic acid solutions can be used for welding higher melting polyolefines.

It is important that the liquid composition which is interposed between the porous thermoplastic and the substrate, be effective over the entire area where the bond is to be formed. Where a line weld is desired, it is important that the liquid be sufficiently viscous that it will lie substantially on a line when applied thereto. Consequently where the liquid composition is an aqueous medium, we prefer that it contains a thickener to increase its viscosity. Examples of suitable thickeners include water soluble wall paper adhesives which are generally high molecular weight compounds such as, hydroxy methyl cellulose, hydroxyethyl cellulose, hydroxypropyl methyl cellulose, methyl cellulose, sodium carboxy methy cellulose, etherified cellulose and salts thereof, vegetable gums, e.g. gum arabic or gum tragacanth, starch ethers, soluble starches, dextrins, alginates, casein, gelatin, polyvinyl alcohol, polyvinyl acetate.

We have found that aqueous solutions containing from 0.5 to 3% by weight, based on the weight of aqueous solution of such a thickener give particularly good results.

The bond between the porous polyolefine and the substrate is formed by interposing the liquid composition between the porous polyolefine and the substrate over the desired weld area and subjecting the composite structure thus formed to radio frequency heating. By the use of radio frequency heating, the outer surface of the porous polyolefine may be retained at a temperature below the melting point of the polyolefine so that the porous structure may be retained.

The optimum amount of the liquid composition that is applied to the weld area is best found by simple experimentation, but we have found that amounts between 5 and 50, preferably 10 and 30 g. m.$^{-2}$ to be particularly suitable. Smaller amounts may give insufficient heating, while when using larger amounts, it may be difficult to ensure that all the vaporised liquid diffuses through the porous polyolefine during the welding operation and hence contact of the porous polyolefine web with the substrate may be prevented.

The thickness of the or each porous polyolefine web should be less than 1.5 mm. or else difficulty may be encountered in passing a radio frequency current therethrough to ensure adequate heating at the interface.

The composite comprising the substrate and the porous thermoplastic with the liquid composition interposed therebetween may conveniently be welded by being clamped between two electrodes to which high frequency current is supplied. The pressure to which the composite is subjected depends upon the thickness and nature of the foamed thermoplastic and the substrate. It should not however destroy the porous structure and we have found that for bonding together two porous films of polyethylene each about 0.5 mm. thick a pressure no greater than 9 kg. cm.$^{-2}$ is sufficient.

As mentioned hereinbefore, the lower the conductivity of the liquid composition, the more critical are the welding conditions. The amount of heat generated by a radio frequency current applied across the liquid medium increases as the frequency increases. At relatively low frequencies, of the order of 25–30 mHz., the amount of current required to achieve the necessary degree of heating to effect welding may be close to that at which the voltage drop across the porous polyolefine equals the breakdown voltage of the polyolefine. Increasing the current above this level results in electrical breakdown of the porous polyolefine with consequent arcing between the electrodes of the welding machine. The greater the conductivity of the liquid composition, the lower will be the minimum current required to achieve a satisfactory weld at any given frequency and hence the wider will be the range of currents between that necessary to achieve a satisfactory weld and that which gives rise to a voltage drop in excess of the breakdown voltage.

Also as the frequency is increased, the aforesaid range of currents is widened.

The minimum current necessary to obtain a satisfactory weld is also dependent on the welding time, i.e. the time to which the composite structure is submitted to the radio frequency current. If the welding time is increased then the minimum current necessary to obtain a good weld is reduced.

However, as the welding time is increased, there is a greater risk that the vaporised liquid will diffuse away from the interface before the porous polyolefine is heated to its melting point if the liquid has a boiling point too far below the melting point of the porous polyolefine.

Furthermore if the welding time is too long the bulk of the porous thermoplastic or the substrate may be heated unduly with consequent risk of destruction of the porous structure, i.e. in the case of foamed polyolefines, the cellular structure. We have found that a frequency of 70 megacycles per second is particularly suitable for bonding two films of porous polyolefines using a water based composition as the liquid composition.

We have found that the process of the present invention produces good bonds between two pieces of porous film without destroying the porous structure along the bonded zone. The bonded zone thus has a pleasing finish which enables the porous film to be sealed and used as sacks, bags or disposable pillow cases. The porous films may also be sealed together to form garments such as inspection gowns and overalls.

The present invention is illustrated but in no way limited by reference to the accompanying examples.

EXAMPLES 1–7

Attempts were made to bond together various open celled foamed thermoplastic films each about 0.4 mm. thick. An aqueous based composition containing 1% by weight of a starch ether wallpaper adhesive, 1% by weight of sodium chloride and 3% by weight of a mixture of a sodium alkyl benzene sulphonate and an octyl cresol/ethylene oxide condensate was applied to one of the foamed films along the lines where the bond was to be formed. The other foamed film was placed on top and the two placed in a radio frequency sealing device where they were subjected to a pressure of approximately 9 kg. cm.$^{-2}$ and a frequency of 70 mHz.

The following results were obtained using various different thermoplastic materials:

The following results were obtained:

| Example | Surfactant | Bond strength, kg. |
|---|---|---|
| 1 | Mixture of sodium alkyl benzene sulphonate and an octyl cresol/ethylene oxide condensate. | 1.3 |
| 7 | Sodium dioctyl sulphosuccinate | 1.1 |
| 8 | Sodium salt of a secondary alkyl sulphonic acid | 1.3 |
| 9 | Sodium dodecyl benzene sulphonate | 1.4 |
| 10 | Sodium lauryl sulphate | 1.0 |

By way of comparison a polyoxyethylated amine (a cationic surfactant liquid at the boiling point of water) gave a weld strength of only 0.5 kg., while welds made with a variety of aqueous solutions of non-ionic surfactants based on polyoxyethylated phenols as the sole surfactant had strengths ranging between 0.25 kg. and 0.7 kg.

The original film had a strength of 1.2 kg. as measured by the same test.

EXAMPLES 11–16

The procedure of Example 1 was repeated but bonding together various samples of spun bonded webs of high density polyethylene fibres. In all cases the power usage was about 900 watts and the welding time 2 seconds.

The results are shown in the table.

| Example | Weight/unit area of each web, gm.$^{-2}$ | Air porosity, ml./cm.$^2$ sec. cm. | Weld description |
|---|---|---|---|
| 11 | 43 | 51×10$^{-2}$ | Good weld. |
| 12 | 52 | 22.2×10$^{-2}$ | Do. |
| 13 | 76 | 6.3×10$^{-2}$ | Do. |
| 14 | 54 | 12.2×10$^{-2}$ | Do. |
| 15 | 59 | 298×10$^{-2}$ | Do. |
| 16 | 43 | 10.4×10$^{-2}$ | Do. |

The procedure was also repeated bonding the spun bonded webs to open celled foamed polyethylene films. Good welds were obtained with all the spun bonded webs with both low density and high density polyethylene foamed films.

EXAMPLES 17–26

Example 1 was repeated but using differing welding times and currents and, in some cases, a frequency of 27 mHz.

The conditions and results are shown in the following table.

| Example | Frequency (mHz.) | Welding time (sec.) | Power output (watts) | Description of weld |
|---|---|---|---|---|
| 17 | 27 | 1 | 1,580 | Weak weld—peels. |
| 18 | 27 | 2 | 1,050 | Good weld. |
| 19 | 27 | 2 | 1,225 | Do. |
| 20 | 27 | 2 | >1,225 | No weld—electrodes arc. |
| 21 | 70 | 0.55 | 750 | Good weld. |
| 22 | 70 | 1 | 600 | Weak weld—peels. |
| 23 | 70 | 1 | 700 | Good weld. |
| 24 | 70 | 1 | 970 | Do. |
| 25 | 70 | 2 | 400 | Weak weld—peels. |
| 26 | 70 | 2 | 435 | Good weld. |

| Example | Nature of films | Porosity to air ml./sq. cm. sec. cm. | Time heated for— | Power | Nature of weld |
|---|---|---|---|---|---|
| 1 | 2 open-celled low density polyethylene films | 5–15×10$^{-2}$ | 2 seconds | 750 watts | Strong neat weld produced. |
| 2 | 2 open-celled high density polyethylene films | 5–15×10$^{-2}$ | do | do | Do. |
| 3 | 2 open-celled films made from blend of 5% polypropylene and 95% high density polyethylene. | 0.3×10$^{-2}$ | 4 seconds | 875 watts | Reasonable in appearance but weak weld. |
| 4 | 2 closed-cell polystyrene foamed films | Too low to detect | | | Bond could not be achieved. |
| 5 | 2-non-foamed polyethylene films | do | | | Do. |
| 6 | 2 foamed polypropylene films | 0.15×10$^{-2}$ | 4 seconds | 1,125 watts | Do. |

EXAMPLES 7–10

Example 1 was repeated for bonding two open celled foamed low density polyethylene films together using a variety of different surfactants in the adhesive composition. The pieces of film were 0.4 mm. thick and were sealed together for two seconds over an area 30 cm. long by 0.6 cm. wide. The strength of the bonds produced were measured by applying a load to a 2.5 cm. wide strip until the weld broke.

These results show that increasing frequency enables satisfactory welds to be made under a wider range of conditions. They also show that increasing the welding time enables lower power outputs of the radio frequency generator to be used.

EXAMPLES 27–45

These results show that increasing frequency enables satisfactory welds to be made under a wider range of conditions. They also show that increasing the welding time enables lower power outputs of the radio frequency generator to be used.

EXAMPLES 27–45

These examples show the welding of a variety of foamed polyolefins using the procedure of Example 1 and varying welding times. The results are shown in the following table. In Examples 44 and 45 the liquid composition contained 20% by weight of sodium chloride instead of 1%.

| Example | Material | Welding time (sec.) | Power output (watts) | Description of weld |
|---|---|---|---|---|
| 27 | 2 films of foamed open-celled low density polyethylene of air porosity 9×10⁻² ml./cm.² sec. cm. | 1 | 600 | Good weld. |
| 28 | 2 pieces of the foamed polyethylene film as used in Example 27 but each laminated to a woven cotton fabric. The laminates were welded to each other with the polyethylene foam surfaces in contact. | 0.4 | 1,200 | No weld. |
| 29 | | 1 | 600 | Weld peels easily. |
| 30 | | 1 | 900 | Weld peels. |
| 31 | | 1.5 | 1,050 | Reasonable weld. |
| 32 | | 2 | 750 | Good weld. |
| 33 | 2 films of open-celled foamed ethylene/vinyl acetate copolymer (containing 7% by weight vinyl acetate units) of air porosity 4×10⁻² ml./cm.² sec. cm. | 0.4 | 1,350 | Do. |
| 34 | | 1 | 600 | Do. |
| 35 | As Example 2 | 0.4 | 1,500 | Do. |
| 36 | | 1 | 750 | Do. |
| 37 | | 2 | 600 | Do. |
| 38 | 2 layers of open-celled polypropylene foam film of air porosity 12×10⁻² ml./cm.² sec. cm. | 1 | 525 | No weld. |
| 39 | | 3 | 525 | Do. |
| 40 | | 3 | 1,500 | Weak weld—peels. |
| 41 | | 3 | >1,500 | Electrodes arced. |
| 42 | | 5 | <1,350 | Weak weld—peels. |
| 43 | | 5 | >1,500 | Electrodes arced. |
| 44 | | 15 | 950 | Fairly good weld. |
| 45 | 2 layers of open-celled foamed poly 4-methyl pentene-1 film of air porosity 7×10⁻² ml./cm.² sec. cm. | 15 | 950 | Weakish weld, peels slightly. |

Examples 38 to 44 show that polypropylene only forms a weak bond when welded with an aqueous composition containing 1% sodium chloride, but can be welded satisfactorily if the composition contains 20% sodium chloride.

Examples 33 and 34 were also repeated, giving good welds, using foamed films of ethylene/vinyl acetate copolymers containing 12% and 18% by weight of vinyl acetate units.

EXAMPLES 46–69

The Example 1 was repeated using different aqueous media as the liquid compositions and differing welding conditions. The results are shown in the following table.

| Example | Aqueous composition, percent | | | Welding time (sec.) | Power output (watts) | Weld description |
|---|---|---|---|---|---|---|
| | Surfactant | NaCl | Thickener | | | |
| 46 | 0 | 0 | 0 | 1 | 285 | No weld. |
| 47 | 0 | 0 | 0 | 2 | 435 | Weld peels. |
| 48 | 0 | 0 | 0 | 3 | 535 | Do. |
| 49 | 0 | 0 | 1 | 1 | 285 | No weld. |
| 50 | 0 | 0 | 1 | 2 | 535 | Weld peels. |
| 51 | 0 | 0 | 1 | 5 | 570 | Do. |
| 52 | 0 | 1 | 0 | 1 | 285 | No weld. |
| 53 | 0 | 1 | 0 | 5 | 435 | Weld peels. |
| 54 | 0 | 1 | 1 | 5 | 500 | Do. |
| 55 | 3 | 0 | 0 | 1 | 435 | Do. |
| 56 | 3 | 0 | 0 | 3 | 850 | Weld peels slightly. |
| 57 | 3 | 0 | 0 | 5 | 710 | Fairly good weld. |
| 58 | 3 | 0 | 1 | 5 | 780 | Do. |
| 59 | 3 | 1 | 0 | 1 | 850 | Do. |
| 60 | 3 | 1 | 0 | 4 | 1,170 | Good weld. |
| 61 | 3 | 1 | 1 | 1 | 570 | Weld peels. |
| 62 | 3 | 1 | 1 | 1 | 840 | Good weld. |
| 63 | 3 | 1 | 1 | 3 | 1,275 | Do. |
| 64 | 3 | 1 | 1 | 4 | 1,275 | Do. |
| 65 | 3 | 2 | 1 | 1 | 500 | Weld peels slightly. |
| 66 | 3 | 2 | 1 | 1 | 570 | Good weld. |
| 67 | 3 | 2 | 1 | 1 | 920 | Do. |
| 68 | 3 | 5 | 1 | 1 | 570 | Do. |
| 69 | 1 | 1 | 1 | 4 | 1,275 | Do. |

I claim:

1. A process for bonding a web of a porous aliphatic polyolefine material having a porosity to air of at least $0.5 \times 10^{-2}$ ml./cm.$^2$ sec. cm. and a thickness of less than 1.5 mm. to a substrate wherein a liquid composition containing a surfactant selected from the group consisting of anionic, cationic or non-ionic surfactants that (a) wets the porous polyolefine material and said substrate, (b) is free of heat-activatable adhesive, and (c) has a conductivity of at least $1 \times 10^{-4}$ mhos cm.$^{-1}$ is interposed between the porous polyolefine material and said substrate, the porous polyolefine and said substrate are contacted and subjected to radio frequency heating at a frequency of at least 25 mHz., whereby the porous polyolefine material is heated at its interface with the liquid composition to a temperature above the boiling point of the liquid composition and above the melting point of the polyolefin material so that the polyolefine material bonds to the substrate and the liquid vaporises, said substrate either having a similar melting point to the porous polyolefine whereby the substrate and the porous polyolefine fuse together during the welding operation or having an open structure whereby the porous polyolefine flows through, and mechanically interlocks with, the interstices of the substrate during the welding operation.

2. A process as claimed in claim 1 wherein the liquid composition is an aqueous solution of a surfactant.

3. A process as claimed in claim 2 wherein the surfactant is a solid at the boiling point of the liquid composition.

4. A process as claimed in claim 2 wherein the aqueous solution contains an electrolyte.

5. A process as claimed in claim 1 wherein the polyolefine is a polymer of ethylene.

6. A process as claimed in claim 4 wherein the polyolefine is a polymer of ethylene and the aqueous solution contains from 0.5 to 5% by weight, based on the weight of the aqueous solution, of the electrolyte.

7. A process as claimed in claim 4 wherein the porous polyolefine is a porous polymer of propylene or 4-methyl pentene-1 and the aqueous solution contains from 10 to 30% by weight of the electrolyte.

8. A process as claimed in claim 2 wherein the aqueous solution contains a thickener.

9. A process as claimed in claim 1 wherein the amount of the liquid composition interposed between the porous web and the substrate is from 5 to 50 g. m.$^{-2}$.

10. A process as claimed in claim 1 wherein the porous polyolefine is in the form of an open celled foamed film.

11. A process as claimed in claim 1 wherein the porous polyolefine is a non woven fibrous web.

12. A process as claimed in claim 1 wherein the substrate is a porous polyolefine material having a porosity to air of at least $0.5 \times 10^{-2}$ ml./cm.$^2$ sec. cm. and a thickness of less than 1.5 mm.

References Cited
UNITED STATES PATENTS

| | | | |
|---|---|---|---|
| 3,276,900 | 10/1966 | Funck | 156—273 |
| 2,992,958 | 7/1961 | Yamaguchi | 156—273 |

DOUGLAS J. DRUMMOND, Primary Examiner

UNITED STATES PATENT OFFICE
CERTIFICATE OF CORRECTION

Patent No. 3,738,886      Dated June 12, 1973

Inventor(s) Robert John Southgate

It is certified that error appears in the above-identified patent and that said Letters Patent are hereby corrected as shown below:

In the heading, line 30 was omitted and should appear as follows:

[30] Foreign Application Priority Data

July 24, 1970     Great Britain     35983/70

Signed and sealed this 27th day of November 1973.

(SEAL)
Attest:

EDWARD M. FLETCHER, JR.      RENE D. TEGTMEYER
Attesting Officer      Acting Commissioner of Patents